US010739649B2

(12) United States Patent
Kang

(10) Patent No.: US 10,739,649 B2
(45) Date of Patent: Aug. 11, 2020

(54) LIQUID CRYSTAL DISPLAY DEVICE REDUCING KICK BACK TO IMPROVE DISPLAY QUALITY

(71) Applicants: Chongqing HKC Optoelectronics Technology Co., Ltd., Chongqing (CN); HKC Corporation Limited, Shenzhen, Guangdong (CN)

(72) Inventor: Chihtsung Kang, Chongqing (CN)

(73) Assignees: Chongqing HKC Optoelectronics Technology Co., Ltd., Chongqing (CN); HKC Corporation Limited, Shenzhen (CN)

( * ) Notice: Subject to any disclaimer, the term of this patent is extended or adjusted under 35 U.S.C. 154(b) by 0 days.

(21) Appl. No.: 16/241,952

(22) Filed: Jan. 7, 2019

(65) Prior Publication Data
US 2020/0124896 A1 Apr. 23, 2020

Related U.S. Application Data

(63) Continuation of application No. PCT/CN2018/113610, filed on Nov. 2, 2018.

(30) Foreign Application Priority Data

Oct. 22, 2018 (CN) .......................... 2018 1 1228059

(51) Int. Cl.
*G02F 1/1343* (2006.01)
*G02F 1/1362* (2006.01)
*G09G 3/36* (2006.01)

(52) U.S. Cl.
CPC .... *G02F 1/13439* (2013.01); *G02F 1/136213* (2013.01); *G02F 1/136286* (2013.01); *G09G 3/3655* (2013.01); *G02F 2001/134354* (2013.01); *G02F 2001/136218* (2013.01); *G09G 2310/0278* (2013.01); *G09G 2320/0626* (2013.01)

(58) Field of Classification Search
CPC .. G02F 1/136213; G02F 2001/134354; G09G 3/36; G09G 3/3622; G09G 3/3625; G09G 3/364; G09G 3/3655
USPC .................................................. 345/87–104
See application file for complete search history.

(56) References Cited

U.S. PATENT DOCUMENTS

2004/0174483 A1* 9/2004 Nakamura ........ G02F 1/136213
349/139
2005/0093805 A1* 5/2005 Hong ................ G02F 1/134363
345/94

(Continued)

FOREIGN PATENT DOCUMENTS

CN 1847964 A 10/2006
CN 105793915 A 7/2016

(Continued)

*Primary Examiner* — Alexander Eisen
*Assistant Examiner* — Nelson Lam

(57) ABSTRACT

The present application discloses a display panel, wherein the driving brightness of a first pixel of the display panel is greater than the original brightness thereof, and a first pixel electrode partially overlaps with a first common electrode; the driving brightness of a second pixel is smaller than the original brightness thereof, and a second pixel electrode partially overlaps with a second common electrode.

19 Claims, 14 Drawing Sheets

(56) References Cited

U.S. PATENT DOCUMENTS

| | | | | |
|---|---|---|---|---|
| 2005/0162363 A1* | 7/2005 | Kim | .................... | G09G 3/3614 |
| | | | | 345/92 |
| 2007/0058096 A1* | 3/2007 | Tsai | ................. | G02F 1/136213 |
| | | | | 349/38 |
| 2007/0188524 A1* | 8/2007 | Bolotski | .............. | G09G 3/2081 |
| | | | | 345/690 |
| 2008/0303768 A1* | 12/2008 | Do | ....................... | G09G 3/3659 |
| | | | | 345/90 |
| 2009/0135125 A1 | 5/2009 | Park | | |
| 2009/0207115 A1* | 8/2009 | Kim | .................... | G02F 1/13624 |
| | | | | 345/90 |
| 2009/0251628 A1* | 10/2009 | Lin | .................... | G02F 1/13439 |
| | | | | 349/39 |
| 2010/0201669 A1* | 8/2010 | Kim | .................... | G09G 3/3648 |
| | | | | 345/211 |
| 2013/0215003 A1* | 8/2013 | Do | ....................... | G09G 3/3659 |
| | | | | 345/92 |
| 2014/0092148 A1* | 4/2014 | Chang | ................... | G02F 1/1333 |
| | | | | 345/690 |
| 2015/0316823 A1* | 11/2015 | Hao | .................... | G02F 1/13439 |
| | | | | 349/139 |
| 2016/0005365 A1 | 1/2016 | Choi et al. | | |
| 2016/0140915 A1* | 5/2016 | Lin | .................... | G09G 3/3648 |
| | | | | 345/58 |
| 2016/0275843 A1* | 9/2016 | Shin | .................... | G09G 3/3614 |

FOREIGN PATENT DOCUMENTS

| | | | |
|---|---|---|---|
| CN | 106125421 A | 11/2016 | |
| CN | 107450243 A | 12/2017 | |
| CN | 107561803 A | 1/2018 | |
| KR | 20030084301 A | 11/2003 | |
| KR | 20070076298 A | 7/2007 | |

\* cited by examiner

LIQUID CRYSTAL DISPLAY DEVICE REDUCING KICK BACK TO IMPROVE DISPLAY QUALITY

CROSS REFERENCE TO RELATED APPLICATIONS

The present application is a Continuation Application of PCT Application No. PCT/CN2018/113610 filed on Nov. 2, 2018, which claims the benefit of Chinese Patent Application No. 201811228059.0 filed on Oct. 22, 2018. All the above are hereby incorporated by reference.

FIELD OF THE DISCLOSURE

The present application relates to the technical field of display, in particular, to a display panel and a display device.

BACKGROUND OF THE DISCLOSURE

In the display panel, the pixels are charged by the data signals on the data lines to control the display brightness of the pixels, thereby displaying a certain image. Due to the parasitic capacitance between the source and the gate of the switching device in the pixel, the scan signal on the scan line changes to couple the parasitic capacitance to the pixel electrode, so that the potential of the pixel electrode changes to generate a kick back phenomenon, which further causes the display image to flicker and the display quality to deteriorate.

SUMMARY OF THE DISCLOSURE

The main purpose of the present application is to provide a display panel, which aims to solve the technical problem of flickering of the image due to kick back in the above display panel, and thus to improve the display quality of the display panel.

To achieve the above purpose, the present application provides a display panel comprising a plurality of data lines, a plurality of scan lines, a plurality of common lines, a plurality of first pixels, and a plurality of second pixels. The common line includes a main common electrode, a first common electrode, and a second common electrode, wherein the main common electrode, the first common electrode, and the second common electrode of the same common line are electrically connected, the main common electrode and the scan line are arranged one after another, the first common electrode is disposed adjacent to the data line, and the second common electrode is disposed adjacent to the data line; the driving brightness of the first pixel is greater than the original brightness of the first pixel, the first pixel including a first pixel electrode, and the first pixel electrode partially overlaps the first common electrode to form a first storage capacitor; the driving brightness of the second pixel is greater than the original brightness of the second pixel, the second pixel including a second pixel electrode, and the second pixel electrode partially overlaps the second common electrode to form a second storage capacitor.

To achieve the above purpose, the present application further provides a display panel comprising a plurality of data lines, a plurality of scan lines, a plurality of common lines, a plurality of first pixels, and a plurality of second pixels. The common line includes a main common electrode, a first common electrode, and a second common electrode, wherein the main common electrode, the first common electrode, and the second common electrode of the same common line are electrically connected, the main common electrode and the scan line are arranged one after another, the first common electrode is disposed adjacent to the data line, and the second common electrode is disposed adjacent to the data line; the driving brightness of the first pixel is greater than the original brightness of the first pixel, the first pixel including a first pixel electrode, and the first pixel electrode partially overlaps the first common electrode to form a first storage capacitor; the driving brightness of the second pixel is greater than the original brightness of the second pixel, the second pixel including a second pixel electrode, and the second pixel electrode partially overlaps the second common electrode to form a second storage capacitor; wherein the first pixel and the second pixel are arranged in a rectangular array, and the first pixel and the second pixel are disposed one after another; a mixed gamma response of the first pixel and the second pixel is equivalent to a preset gamma response.

To achieve the above purpose, the present application further provides a display device comprising a display panel including a plurality of data lines, a plurality of scan lines, a plurality of common lines, a plurality of first pixels, and a plurality of second pixels. The common line includes a main common electrode, a first common electrode, and a second common electrode, wherein the main common electrode, the first common electrode, and the second common electrode of the same common line are electrically connected, the main common electrode and the scan line are arranged one after another, the first common electrode is disposed adjacent to the data line, and the second common electrode is disposed adjacent to the data line; the driving brightness of the first pixel is greater than the original brightness of the first pixel, the first pixel including a first pixel electrode, and the first pixel electrode partially overlaps the first common electrode to form a first storage capacitor; the driving brightness of the second pixel is greater than the original brightness of the second pixel, the second pixel including a second pixel electrode, and the second pixel electrode partially overlaps the second common electrode to form a second storage capacitor.

In the technical solution of the present application, the display panel comprises a plurality of data lines, a plurality of scan lines, a plurality of common lines, a plurality of first pixels, and a plurality of second pixels. The common line includes a main common electrode, a first common electrode, and a second common electrode, wherein the main common electrode, the first common electrode, and the second common electrode of the same common line are electrically connected, the main common electrode and the scan line are arranged one after another, the first common electrode is disposed adjacent to the data line, and the second common electrode is disposed adjacent to the data line; the driving brightness of the first pixel is greater than the original brightness of the first pixel, the first pixel including a first pixel electrode, and the first pixel electrode partially overlaps the first common electrode to form a first storage capacitor; the driving brightness of the second pixel is greater than the original brightness of the second pixel, the second pixel including a second pixel electrode, and the second pixel electrode partially overlaps the second common electrode to form a second storage capacitor. Among them, the driving brightness of the first pixel is greater than the original brightness of the first pixel, and the driving brightness of the second pixel is smaller than the original brightness of the second pixel, thereby increasing the viewing angle of the display panel and reducing the color cast while ensuring that the transmittance of the display panel is constant. Further, through setting a first common electrode and a second common electrode adjacent to the data line, through forming a first storage capacitor by the first common electrode and the first pixel electrode together, and through forming a second storage capacitor by the second common electrode and the second pixel electrode together, the space, between the first pixel electrode and the data line, and the second pixel electrode and the data line, is fully utilized, and then a large drop in the aperture ratio of the first pixel and the second pixel is avoided. Meanwhile, the first common electrode and the second common electrode may also shield the interference of the data signal on the data line with the first pixel level of the first pixel electrode and the second pixel level of the second pixel electrode, so that the minimum distance between the first pixel electrode and the data line, and between the second pixel electrode and the data line may be further reduced, and even an effect of increasing the aperture ratio of the first pixel and the second pixel may be achieved. The increase in aperture ratio reduces the power consumption of the backlight source required for the display panel, which contributes to energy conservation. The size of the first storage capacitor is positively correlated with the overlapping area between the first pixel electrode and the first common electrode, and the size of the second storage capacitor is positively correlated with the overlapping area between the second pixel electrode and the second common electrode; by adjusting the overlapping area between the first pixel electrode and the first common electrode, and between the second pixel electrode and the second common electrode, the required first storage capacitor and second storage capacitor may be obtained to reduce the kick back on the first pixel level and the second pixel level caused by the interference of the scan signal, thereby alleviating the flicker phenomenon in the display image and improving the display effect.

Figure 1:
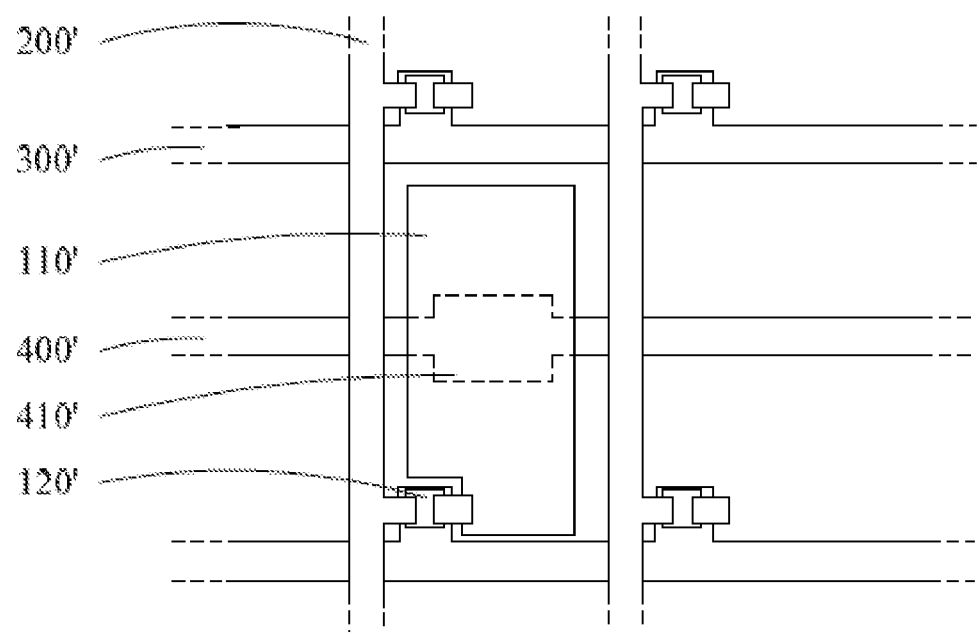
FIG. 1 is a structural view of a display panel in an example.

With reference to the drawings, the implement of the object, features and advantages of the present application will be further illustrated in conjunction with embodiments.

DETAILED DESCRIPTION OF THE EMBODIMENTS

The technical solutions in the embodiments of the present application will be clearly and completely described hereafter in connection with the drawings in embodiments of the present application. It is apparent that the described embodiments are only a part of the embodiments of the present application, but not the whole. Based on the embodiments of the present application, all the other embodiments obtained by those of ordinary skill in the art without inventive effort are within the scope of the present application.

It should be noted that, if there is a directional indication (such as up, down, left, right, front, back, . . . ) in the embodiments of the present application, the directional indication is only used to explain the relative positional relationship, the motion situation, etc. between the components in a certain posture (as shown in the drawings), and if the certain posture changes, the directional indication also changes accordingly.

In addition, if there is a description related to "first", "second", etc. in the embodiments of the present application, the description of the "first", "second", etc. is used for the purpose of description only, and is not to be construed as indicating or implying its relative importance or implicitly indicating the number of technical features indicated. Thus, features defined by "first" or "second" may include at least one of the features, either explicitly or implicitly. In addition, the meaning of "and/or" appearing throughout the text includes three parallel solutions, taking "A and/or B" as an example, including the A solution, or the B solution, or the solution in which both A and B are simultaneously satisfied. In addition, the technical solutions between the various embodiments may be combined with each other, but must be based on what can be implemented by those skilled in the art. When the combination of technical solutions is contradictory or impossible to achieve, it should be considered that the combination of such technical solutions does not exist and is not within the scope of protection claimed in the present application.

The technical solution of the present application will be described in detail later by taking a liquid crystal display panel as an example. FIG. 1 is a structural view of a display panel in an example. The display panel comprises a plurality of pixels (the structure of one pixel and its surrounding data lines and scan lines is shown in FIG. 1), a plurality of data lines 200', a plurality of scan lines 300', a plurality of common lines 400'. Among them, the pixels are arranged in a rectangular array, and the pixels include a pixel electrode 110' and a switching device 120'. The switching device 120' is typically a thin film transistor TFT', and the thin film transistor TFT' controls the data line to charge the corresponding pixel under the action of the scan signal G(n)' on the scan line. Generally, three pixels of red pixels, green pixels, and blue pixels are included in the display panel, and at least one red pixel, one green pixel, and one blue pixel form a pixel group, thereby displaying a color image according to the spatial color mixing principle. The pixel generates a certain display brightness by the combination of the scan signal G(n)' on the scan line 300' and the data signal on the data line 200'. In order to maintain the pixel level on the pixel electrode 110' to maintain the display effect, the common line 400' includes a common electrode 410', and the pixel electrode 110' at least partially overlaps with the common electrode 410' to form the storage capacitor Cst'. In FIG. 1, the common electrode 410' is formed at a central portion of the pixel, and the common electrode 410' overlaps with the partial pixel electrode 110' to form a storage capacitor Cst'.

Figure 2:
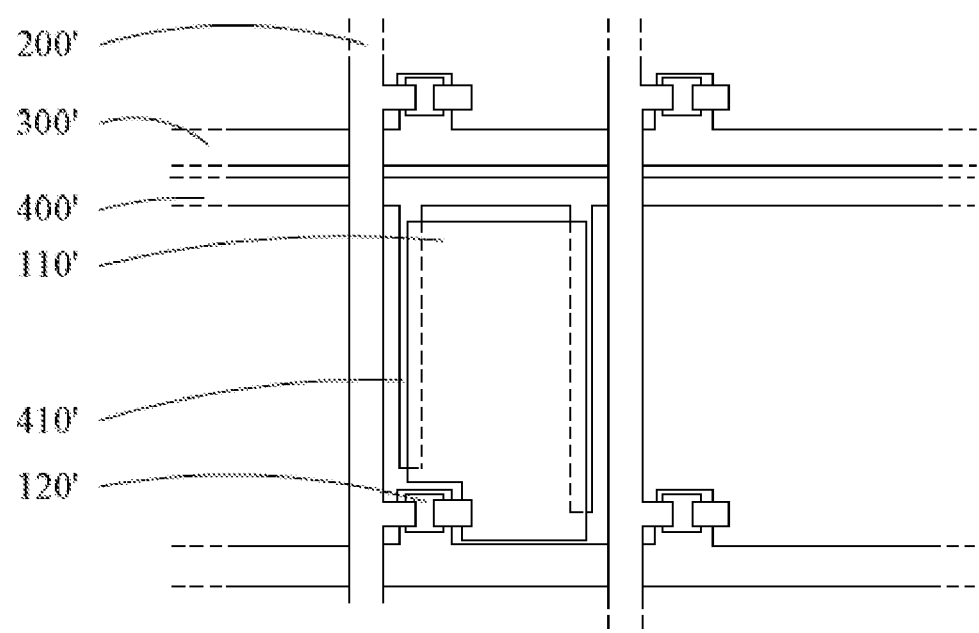
FIG. 2 is a structural view of a display panel in another example.

FIG. 2 is a structural view of a display panel in another example. In this example, the common electrode 410' is formed at a position between the pixel electrode 110' and the data line 200', thereby making full use of the space on the display panel, which is advantageous in avoiding a large reduction in the aperture ratio of the pixel.

Figure 3:
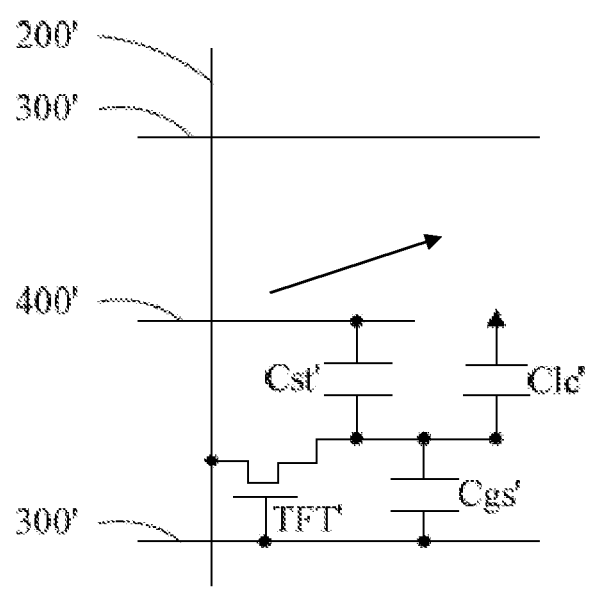
FIG. 3 is a view showing the circuit structure of the display panel of FIGS. 1 and 2.
Figure 4:
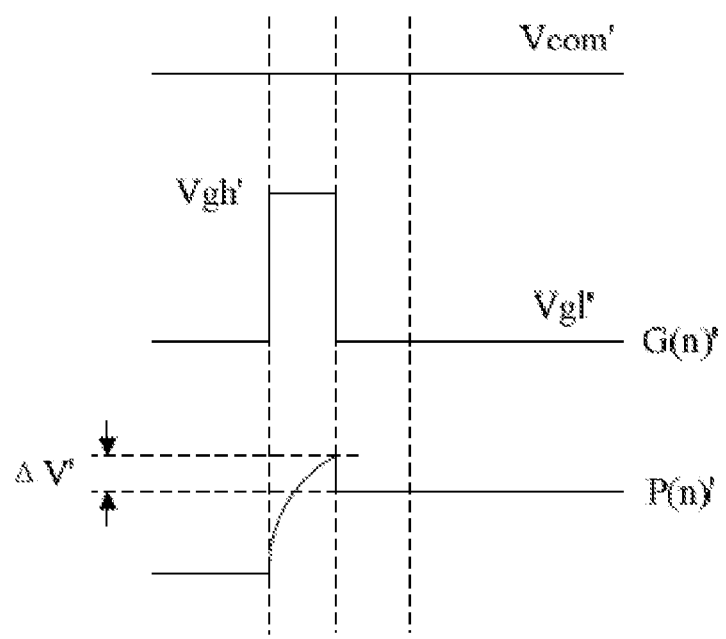
FIG. 4 is a view showing the signal timing of the display panel of FIGS. 1 and 2.

FIG. 3 is a view showing the circuit structure of the display panel of FIGS. 1 and 2. Among them, Cst' is the storage capacitor of the pixel, that is, the capacitance formed between the common electrode 410' and the pixel electrode 110'; Clc' is a liquid crystal capacitance of the pixel, and Cgs' is the parasitic capacitance between the source and the gate of the switching device 120' in the pixel. FIG. 4 is a view showing the signal timing of the display panel of FIGS. 1 and 2. Among them, Vcom' is the common level of a common signal on the common line 400', Vgh' is the high level of the scan signal G(n)' on the scan line 300', and Vgl' is the low level of the scan signal G(n)' on the scan line 300'. When the scan signal G(n)' is converted from the high level Vgh' to the low level Vgl', the pixel level P(n)' on the pixel electrode 110' of the same stage will vary by $\Delta V'$, and according to FIGS. 3 and 4, $\Delta V'$ satisfies $\Delta V'=(Vgh'-Vgl')*Cgs'/(Cgs'+Cst'+Clc')$.

According to the above example, in the display panel, in order to reduce the variation of the pixel level on the pixel electrode as much as possible, to alleviate the flicker of the screen in the display panel, and to improve the display effect, the storage capacitor should be increased as much as possible while other conditions are constant. However, the storage capacitor is related to the overlapping area between the pixel electrode and the common electrode, and the larger the overlapping area, the larger the storage capacitor. On the other hand, although the pixel electrode is usually made of transparent indium tin oxide (ITO), while considering that the common electrode is usually made of non-transparent metal, in the example shown in FIG. 1, the non-transparent common electrode will cause a decrease in the light transmission area in the pixel, that is, the aperture ratio of the pixel decreases, and then the display brightness of the display panel is reduced overall, or the energy consumption of the required backlight source is increased. In the example shown in FIG. 2, the common electrode extends into the space between the pixel electrode and the data line, and overlaps with the pixel electrode to form a storage capacitor, thereby avoiding a decrease in the pixel aperture ratio to some extent.

Figure 5:
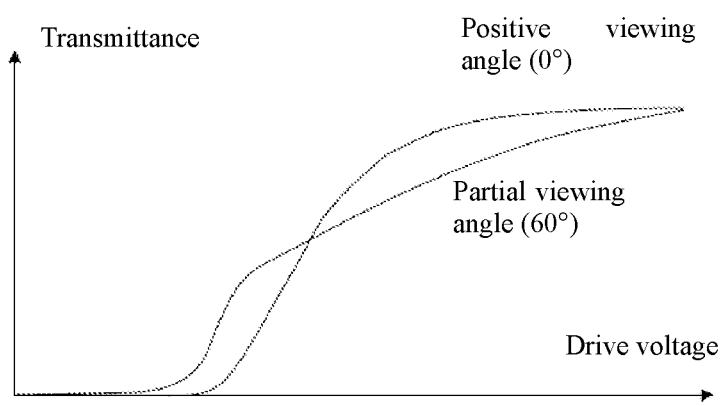
FIG. 5 is a view showing a transmittance-drive voltage of a display panel at different viewing angles in still another example.
Figure 6:
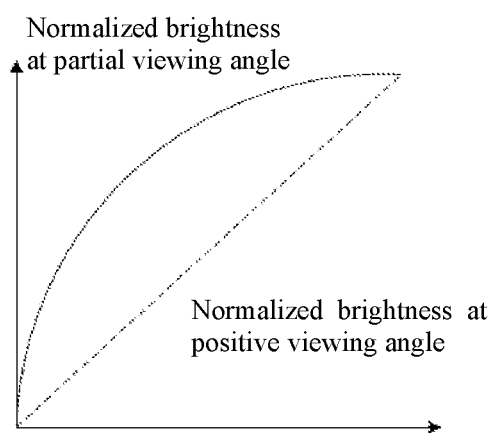
FIG. 6 is a view showing a normalized brightness in a normalized brightness-positive viewing angle of the display panel in FIG. 5.

FIG. 5 is a transmittance-drive voltage curve of a display panel at different viewing angles. In the case of a partial viewing angle, the transmittance-drive voltage curve will drift relative to the transmittance-drive voltage curve in the case of a positive viewing angle, resulting in a decrease in contrast of the image, a phenomenon in which the color cast and the viewing angle become small. As shown by the broken lines in FIGS. 6 and 7, in an ideal case, the normalized brightness at a partial viewing angle is linear with the normalized brightness at a positive viewing angle. However, as shown by the solid line in FIG. 6, in the actual case, the normalized brightness at a partial viewing angle has a nonlinear relationship with the normalized brightness at the positive viewing angle, resulting in a smaller viewing angle of the display device.

Figure 7:
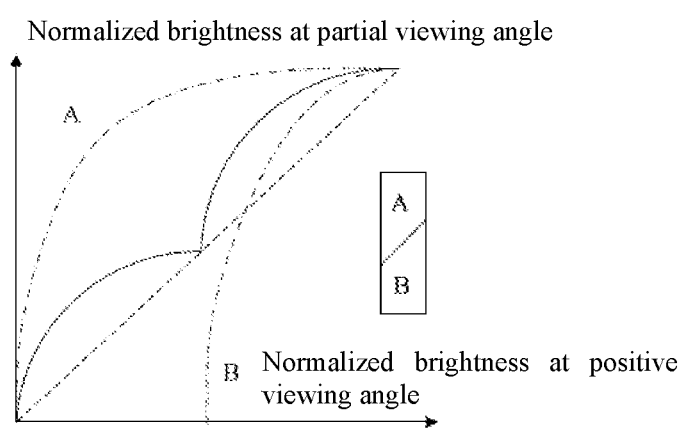
FIG. 7 is a view showing a normalized brightness in a normalized brightness-positive viewing angle of the display panel in a still another example.

As shown in FIG. 7, in still another example of the display panel, in order to correct the phenomenon that the viewing angle of the display device becomes small, the pixels are split into two parts A and B, and Part A and Part B are controlled to display different brightnesses. In FIG. 7, the two dotted lines correspond to the relationship between the normalized brightness of Part A and Part B in the partial viewing angle and the positive viewing angle, wherein the brightness actually displayed in Part A is too high, and the brightness actually displayed in Part B is low. The effect of the final mixing of Part A and Part B is as shown by the solid line in FIG. 7, which is close to the ideal case shown by the broken line in FIG. 7, thereby improving the viewing angle of the display device and reducing the color cast. However, such a manner of partitioning the pixels themselves will result in a decrease in pixel transmittance in the display panel, resulting in deterioration of display quality.

Figure 8:
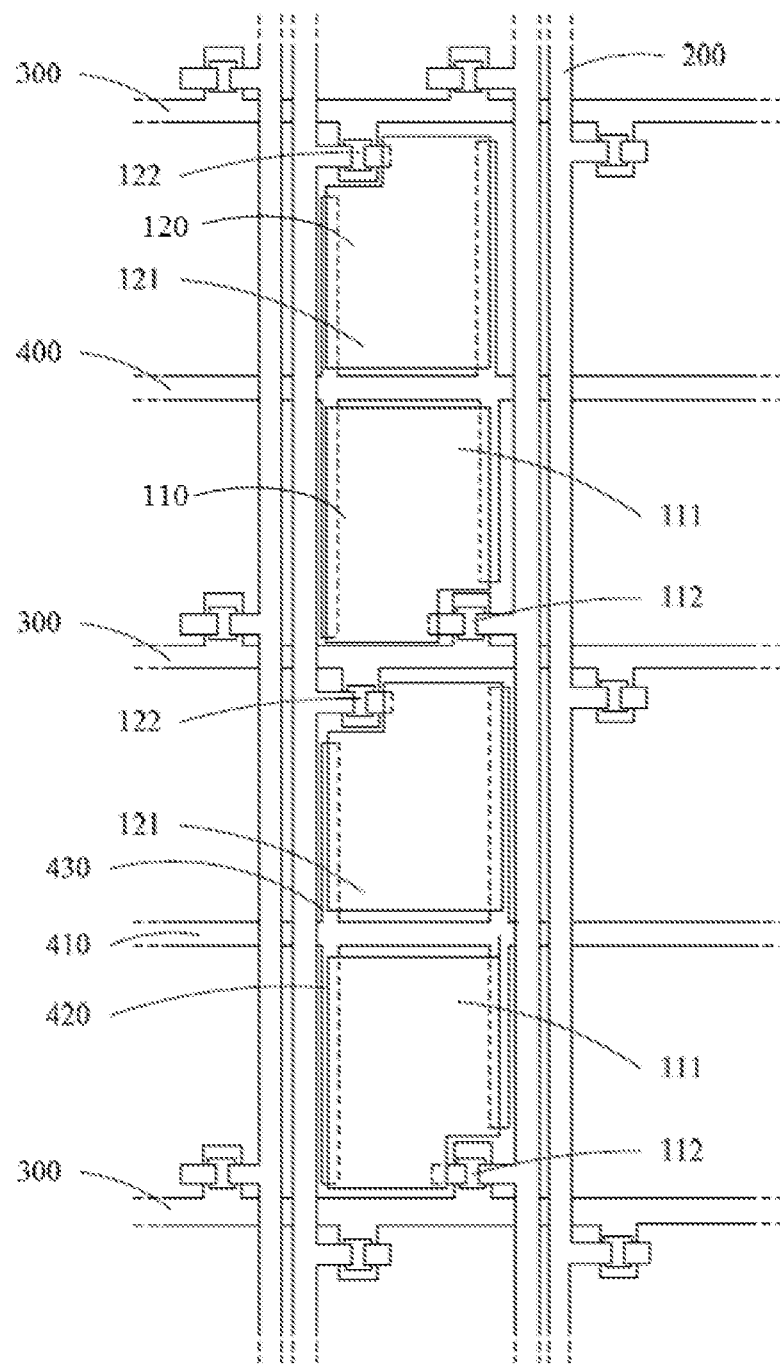
FIG. 8 is a structural view of an embodiment of a display panel of the present application.
Figure 10:
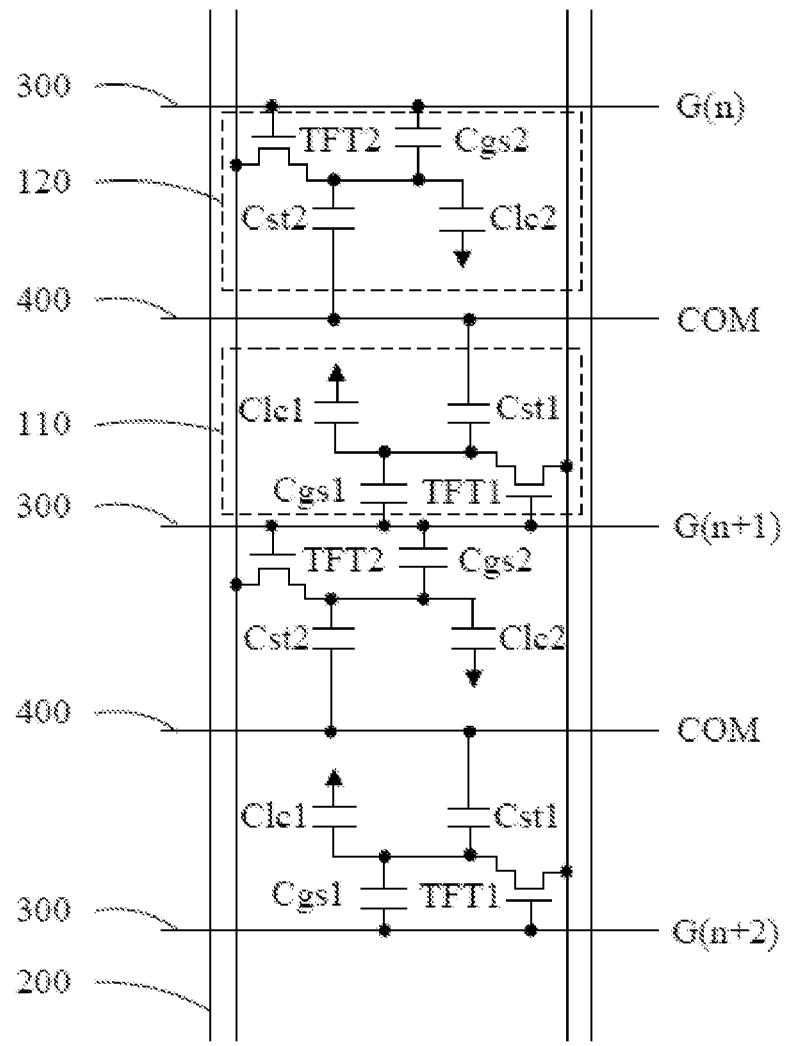
FIG. 10 is a view showing the circuit structure of the display panel of FIGS. 8 and 9.

The present application provides a display panel. In an embodiment of the present application, as shown in FIGS. 8 and 10, the display panel comprises a plurality of data lines 200, a plurality of scan lines 300, a plurality of common lines 400, a plurality of first pixels 110, and a plurality of second pixels 120. The common line includes a main common electrode 410, a first common electrode 420, and a second common electrode 430, wherein the main common electrode 410, the first common electrode 420, and the second common electrode 430 of the same common line 400 are electrically connected, the main common electrode 410 and the scan line 300 are arranged one after another, the first common electrode 420 is disposed adjacent to the data line 200, and the second common electrode 430 is disposed adjacent to the data line 200; the driving brightness of the first pixel 110 is greater than the original brightness of the first pixel 110, the first pixel 110 including a first pixel electrode 111, and the first pixel electrode 111 partially overlaps the first common electrode 420 to form a first storage capacitor Cst 1; the driving brightness of the second pixel 120 is greater than the original brightness of the second pixel 120, the second pixel 120 including a second pixel electrode 121, and the second pixel electrode 121 partially overlaps the second common electrode 430 to form a second storage capacitor Cst 2.

Specifically, the data line 200 may extend in the longitudinal direction of the display panel, and the plurality of data lines 200 are arranged along the lateral direction of the display panel. Specifically, the scan line 300 may extend in the lateral direction of the display panel, and the plurality of scan lines 300 are arranged along the longitudinal direction of the display panel. The main common electrode 410 may extend in a lateral direction of the display panel, the plurality of main common electrodes 410 are arranged along the longitudinal direction of the display panel, and the main common electrode 410 and the scan line 300 are arranged one after another, that is, adjacent to the upper and lower directions of the main common electrode 410 is a scan line 300, and adjacent to the upper and lower directions of the scan line 300 is the main common electrode 410; the first common electrode 420 and the second common electrode 430 may extend in a longitudinal direction of the display panel to display the lateral arrangement of the panel along the first common electrode 420 and the second common electrode 430, and the first common electrode 420 and the second common electrode 430 are disposed adjacent to the data line 200.

In order to increase the viewing angle of the display panel, to reduce the color cast in the case of the partial viewing angle, a first pixel 110 and a second pixel 120 are included in the display panel, wherein the driving brightness of the first pixel 110 is greater than its original brightness and the driving brightness of the second pixel 120 is smaller than its original brightness to simulate the relationship between the normalized brightness of Part A and the Part B as shown in FIG. 7 at the partial viewing angle and the positive viewing angle Among them, the original brightness refers to the display brightness directly determined according to the display image, and the driving brightness is the brightness that is increased or decreased relative to the original brightness.

Further, the first pixel 110 includes a first pixel electrode 111, and the second pixel 120 includes a second pixel electrode 121. Since the first common electrode 420 and the second common electrode 430 are typically made of metal, shielding of data signals on the data line 200 may be formed, thereby reducing interference of the data signal with the first pixel level of the first pixel electrode 111 and the second pixel level of the second pixel electrode 112. Accordingly, the minimum distance between the first pixel electrode 111 and the data line 200 and between the second pixel electrode 121 and the data line 200 may be reduced. The first pixel electrode 111 partially overlaps the first common electrode 420 to form a first storage capacitor Cst1. By changing the overlapping area between the first pixel electrode 111 and the first common electrode 420, the regulation of the first storage capacitor Cst1 may be achieved. As the overlapping area between the first pixel electrode 111 and the first common electrode 420 increases, the first storage capacitor Cst1 increases. Then, the kick back of the first pixel level will decrease as every time a scan signal or common signal is converted. Further, also by designing the level and timing relationship between the scan signal and the common signal, and the size of the corresponding first storage capacitor Cst1, the effect of multiple conversions of the scan signal and the common signal on the first pixel level on the first pixel electrode 111 may be canceled, so that the flicker of the display image is further alleviated, which will be explained in detail later. Similarly, the adjustment of the second storage capacitor Cst2 may be implemented by changing the overlapping area between the second pixel electrode 121 and the second common electrode 430 to alleviate the flicker of the display image and improve the display quality.

Meanwhile, in consideration of the shielding effect of the first common electrode 420 on the data signal, in the present embodiment, even if the distance between the first pixel electrode 111 and the data line 200 is small, the interference of the data signal on the first pixel level may be avoided, and the normal display effect is ensured. Therefore, the transparent first pixel electrode 111 may be extended in the direction of the data line 200 to increase the aperture ratio of the first pixel 110. Similarly, the transparent second pixel electrode 121 is extended in the direction of the data line 200 to increase the aperture ratio of the second pixel 120, thereby improving the display effect and reducing the power consumption required for display.

In the present embodiment, the display panel comprises a plurality of data lines 200, a plurality of scan lines 300, a plurality of common lines 400, a plurality of first pixels 110, and a plurality of second pixels 120. The common line 400 includes a main common electrode 410, a first common electrode 420, and a second common electrode 430, wherein the main common electrode 410, the first common electrode 420, and the second common electrode 430 of the same common line 400 are electrically connected, the main common electrode 410 and the scan line 300 are arranged one after another, the first common electrode 420 is disposed adjacent to the data line 200, and the second common electrode 430 is disposed adjacent to the data line 200; the driving brightness of the first pixel 110 is greater than the original brightness of the first pixel 110, the first pixel 110 including a first pixel electrode 111, and the first pixel electrode 111 partially overlaps the first common electrode 420 to form a first storage capacitor Cst 1; the driving brightness of the second pixel 120 is greater than the original brightness of the second pixel 120, the second pixel 120 including a second pixel electrode 121, and the second pixel electrode 121 partially overlaps the second common electrode 430 to form a second storage capacitor Cst 2. Among them, the driving brightness of the first pixel 110 is greater than the original brightness of the first pixel 110, and the driving brightness of the second pixel 120 is smaller than the original brightness of the second pixel 120, thereby increasing the viewing angle of the display panel and reducing the color cast while ensuring that the transmittance of the display panel is constant. Further, through setting a first common electrode 420 and a second common electrode 430 adjacent to the data line 200, through forming a first storage capacitor Cst 1 by the first common electrode 420 and the first pixel electrode 111 together, and through forming a second storage capacitor Cst2 by the second common electrode 430 and the second pixel electrode 121 together, the space, between the first pixel electrode 111 and the data line 200, and the second pixel electrode 121 and the data line 200, is fully utilized, and then a large drop in the aperture ratio of the first pixel 110 and the second pixel 120 is avoided. Meanwhile, the first common electrode 420 and the second common electrode 430 may also shield the interference of the data signal on the data line with the first pixel level of the first pixel electrode 111 and the second pixel level of the second pixel electrode 121, so that the minimum distance between the first pixel electrode 111 and the data line 200, and between the second pixel electrode 121 and the data line 200 may be further reduced, and even an effect of increasing the aperture ratio of the first pixel 110 and the second pixel 120 may be achieved. The increase in aperture ratio reduces the power consumption of the backlight source required for the display panel, which contributes to energy conservation. The size of the first storage capacitor Cst1 is positively correlated with the overlapping area between the first pixel electrode 111 and the first common electrode 420, and the size of the second storage capacitor Cst2 is positively correlated with the overlapping area between the second pixel electrode 121 and the second common electrode 430; by adjusting the overlapping area between the first pixel electrode 111 and the first common electrode 420, and between the second pixel electrode 121 and the second common electrode 430, the required first storage capacitor Cst1 and second storage capacitor Cst2 may be obtained to reduce the kick back on the first pixel level and the second pixel level caused by the interference of the scan signal, thereby alleviating the flicker phenomenon in the display image and improving the display effect.

Figure 9:
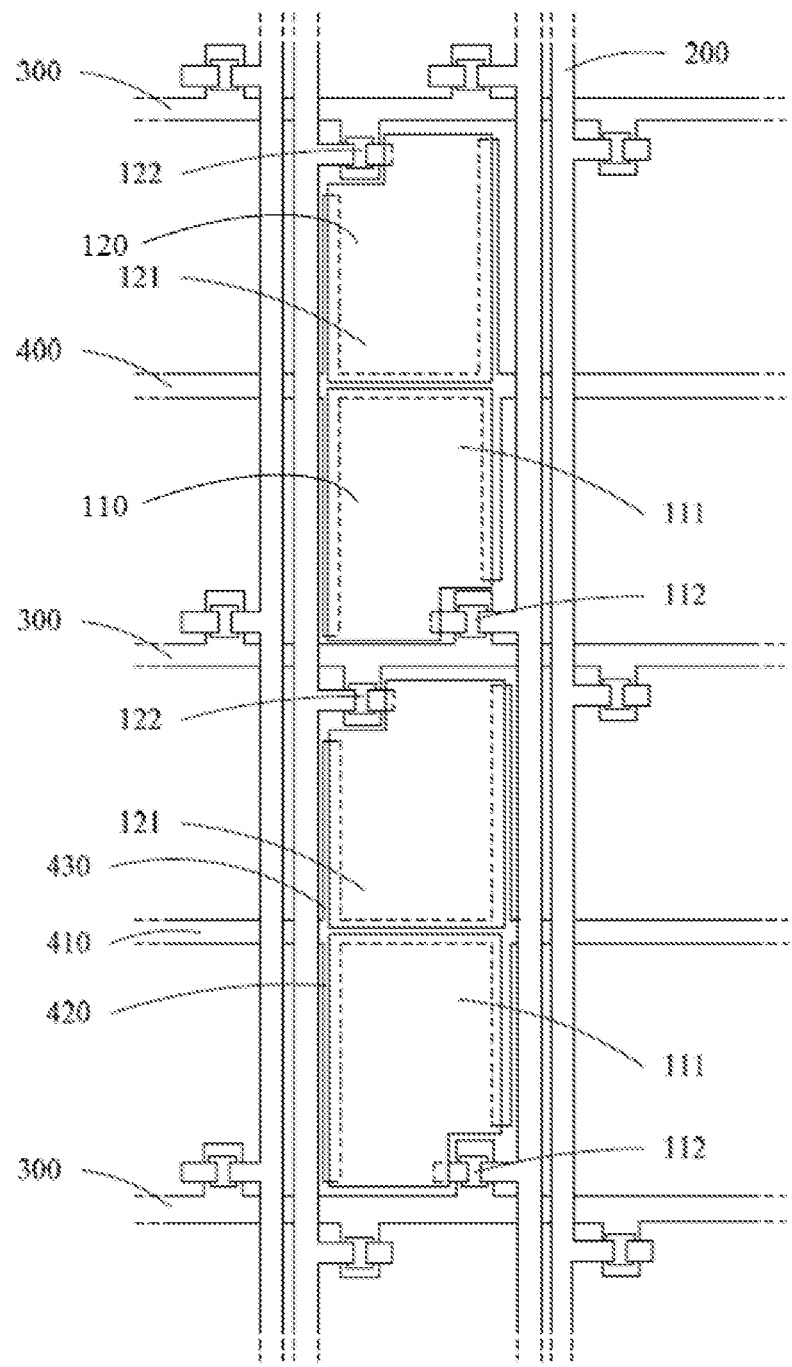
FIG. 9 is a structural view of another embodiment of a display panel of the present application.

In another embodiment of the present application, the first pixel electrode 111 partially overlaps the main common electrode 410 and the first common electrode 420 to form a first storage capacitor Cst1; and/or the second pixel electrode 121 partially overlaps the main common electrode 410 and the second common electrode 430 to form a second storage capacitor Cst2. FIG. 9 shows that the first pixel electrode 111 partially overlaps the main common electrode 410 and the first common electrode 420; and the second pixel electrode 121 partially overlaps the main common electrode 410 and the second common electrode 430. The first pixel electrode 111 partially overlaps the main common electrode 410 in addition to partially overlapping the first common electrode 420, contributing to further increasing the overlapping area between the first pixel electrode 111 and the common line 400, thereby increasing the first storage capacitor Cst1 or expanding the adjustable range of the first storage capacitor Cst1 to alleviate the flicker of the display panel. And, the first pixel electrode 111 extends toward the main common electrode 410 to form an overlap region, which helps to further increase the aperture ratio of the first pixel 110. Thereby, the display brightness of the display panel is stronger, or the power consumption of the backlight source required by the display panel is smaller, to improve the display effect of the display panel. Similarly, the second pixel electrode 121 partially overlaps the main common electrode 410 and the second common electrode 430 to facilitate adjustment of the second storage capacitor Cst2 to alleviate the flicker of the display panel while increasing the aperture ratio of the second pixel 120, so that the display panel has a stronger display brightness, or the required backlight source consumes less power, to improve the display effect of the display panel.

As shown in FIGS. 8 and 9, one of the first pixel electrodes 111 partially overlaps two of the first common electrodes 420, and two of the first common electrodes 420 are disposed on both sides of the first pixel electrode 111 respectively; and/or, one of the second pixel electrodes 121 partially overlaps two of the second common electrodes 430, and two of the second common electrodes 430 are disposed on both sides of the second pixel electrode 121 respectively. Among them, the first common electrode 420 and the second common electrode 430 extend to both sides of the main common electrode 410, respectively, to simplify the structure of the common line 400. Setting the first common electrode 420 on both sides of the first pixel 110, and/or the second common electrode 430 on both sides of the second pixel 120 firstly helps to further increase the first storage capacitor Cst1 and the second storage capacitor Cst2, or to expand the adjustable range of the first storage capacitor Cst1 and the second storage capacitor Cst2 for simplifying the adjustment, thereby avoiding flicker of the display image due to the kick back of pixel levels; secondly, the first common electrode 420 and the second common electrode 430 adjacent to the data line 200 do not adversely affect the aperture ratio of the first pixel 110 and the second pixel 120, and when the transparent first pixel electrode 111 and the second pixel electrode 121 respectively extend in the direction of the data line, it is helpful to further increase the aperture ratio of the first pixel 110 and the second pixel 120; thirdly, one side of the first common electrode 420 is located between the first pixel electrode 111 and the data line 200, and one side of the second common electrode 430 is located between the second pixel electrode 121 and the data line 200, which helps to enhance the shielding effect on the data signal on the data line on both sides of the first pixel electrode 111 and the second pixel electrode 121, thereby making the first pixel level and the second pixel level more stable and improving the display effect.

Figure 11:
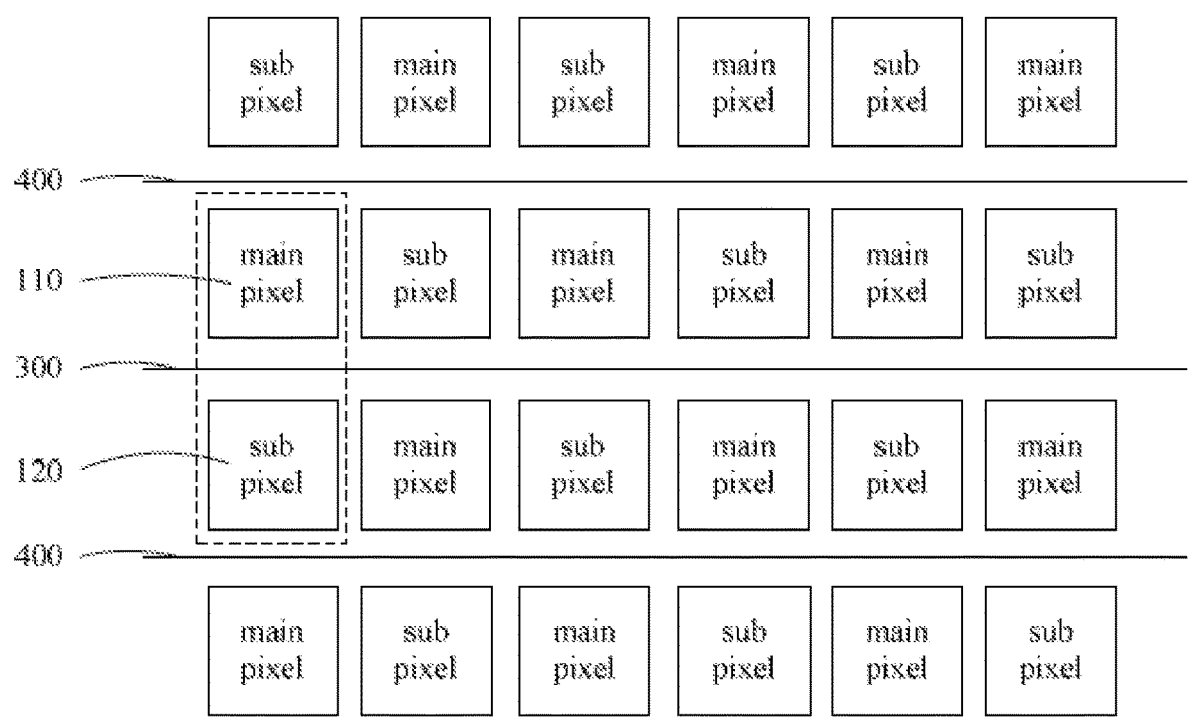
FIG. 11 is a structural view of a still another embodiment of a display panel of the present application.

Based on the above embodiments, as shown in FIG. 11, in a still another embodiment of the present application, the first pixel 110 and the second pixel 120 are arranged in a rectangular array and the first pixel 110 and the second pixel 120 are arranged one after another, that is, the pixels adjacent to the top, bottom, left, and right of the first pixel 110 are all the second pixels 120, and the pixels adjacent to the upper, lower, left, and right sides of the second pixel 120 are all the first pixels 110. Further, the first pixel 110 and the second pixel 120 corresponding to the adjacent two common lines 400 are electrically connected to the same scan line 300, the first pixel 110 and the second pixel 120 are disposed adjacent to each other, the scan line 300 is located between two adjacent common lines 400, and the first pixel 110 and the second pixel 120 are electrically connected to two data lines (not shown in FIG. 11), respectively. As shown by the dashed box in FIG. 11, the first pixel 110 and the second pixel 120 adjacent to each other on the same scan line 300 form a pixel group. In the pixel group, the first pixel 110 and the second pixel 120 are respectively controlled by two data lines 200 such that the driving brightness of the first pixel 110 is greater than its original brightness and the driving brightness of the second pixel 120 is less than its original brightness to increase the viewing angle of the display panel and reduce the color cast. Of course, in order to realize the display of the color image, the first pixel may specifically be a red first pixel, a blue first pixel, and a green first pixel, and the second pixel may specifically be a red second pixel, a blue second pixel, and a green second pixel, and a larger pixel group is formed by combining the color and the driving brightness, which will not be described herein.

Figure 12:
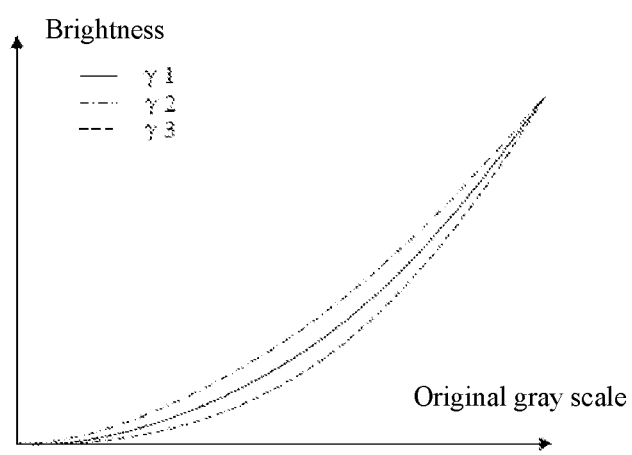
FIG. 12 is a view of the gamma response of the display panel of FIG. 11.

Further, a mixed gamma response of the first pixel 110 and the second pixel 120 is equivalent to a preset gamma response. In the display panel, due to the influence of the photoelectric characteristics of the liquid crystal, if the driving level of the driving signal is directly determined based on the initial image signal, there is a nonlinear gamma response between the driving signal and the finally-displayed brightness. Therefore, in the driving process, it is required to perform inverse gamma correction on the original image signal to obtain a corrected driving signal for compensating for the nonlinear characteristics of the display panel and achieving distortion-free display. As show in FIG. 12, when performing inverse gamma correction on the original image signal, the corrected gamma value is determined in the inverse gamma correction process according to the gamma value corresponding to the gamma response of the display panel, specifically, there is usually a reciprocal relationship between the corrected gamma value and the gamma value. The gamma value reflects the characteristics of the display panel itself. Among them, the first gamma value γ1 corresponds to a normal display state, a typical first gamma value γ1 is 2.2 to 2.5, and a commonly used first gamma value γ1 is 2.2; the second gamma value γ2 corresponds to a display state in which the display is bright, and the second gamma value γ2 is smaller than the first gamma value γ1; the third gamma value γ3 corresponds to a display state in which the display is dark, and the third gamma value γ3 is greater than the first gamma value γ1. Therefore, by selecting an appropriate second gamma value γ2 and third gamma value γ3, the mixed gamma response of the first pixel 110 and the second pixel 120 is equivalent to a preset gamma response, i.e., the gamma response corresponding to the first gamma value γ1, to improve display effect.

In the above embodiments of the present application, the larger the first storage capacitor Cst1 and the second storage capacitor Cst2, the smaller the kick back of the first pixel level and the second pixel level each time the scan signal or the common signal convert. Further, when the scan signal or the common signal has a different conversion direction, the direction of the kick back of the first pixel level and the second pixel level is also different. Therefore, the respective kick back for each time of the first pixel level and the second pixel level in each cycle may be offset by designing the relationship between the level and timing of the scan signal and the common signal to further alleviate the flicker of the display image. In order to achieve the above objectives, the common signal COM on the common line has a first common level Vc1, a second common level Vc2, and a third common level Vc3, the first common level Vc1 being lower than the second common level Vc2 and the second common level Vc2 being lower than the third common level Vc3; the second common level Vc2 is located on a rising edge side of the first common level Vc1, and the third common level Vc3 is located on a rising edge side of the second common level Vc2; a first continuous duration of the first common level Vc1 is greater than or equal to twice an opening duration of the scan signal on the scan line, a second continuous duration of the second common level Vc2 is greater than or equal to the opening duration, a third continuous duration of the third common level Vc3 is greater than or equal to the opening duration, and the first continuous duration, the second continuous duration, and the third continuous duration are all integer multiples of the opening duration; a falling edge of the first common level Vc1 is synchronized with the rising edge of the scan signal G(n) of the current stage, and the rising edge of the scan signal G(n+1) of the latter stage is synchronized with the falling edge of the scan signal G(n) of the current stage. Among them, the signal region corresponding to the first common level Vc1 covers the falling edge of the scanning signal G(n) of the current stage and the scan signal G(n+1) of the latter stage. When the scan signal is converted from the high level Vgh to the low level Vgl, the first pixel level and the second pixel level decrease. And when the first common level Vc1 is converted to the second common level Vc2, and the second common level Vc2 is converted to the third common level Vc3, the first pixel level and the second pixel level increases to offset each other to achieve stable display of the image.

Further, in one cycle, when the decrease in the first pixel level is offset by the increase and the decrease in the second pixel level is offset by the increase, the stability of the display screen is optimal, which may be achieved by adjusting the sizes of the first storage capacitors Cst1 and Cst2. Among them, the first storage capacitor Cst1 of the first pixel 110 satisfies Cst1=(Vgh−Vgl)*Cgs1/(Vc3−Vc1), and the second storage capacitor Cst2 of the second pixel 120 satisfies Cst2=(Vgh−Vgl)*Cgs2/(Vc3)−Vc1); Vgh is a high level of the scan signal, and Vgl is a low level of the scan signal; the first pixel 110 includes a first switching device 112, and a first parasitic capacitance Cgs1 is formed between a source and a gate of the first switching device 112; the second pixel 120 includes a second switching device 122, and a second parasitic capacitance Cgs2 is formed between a source and a gate of the second switching device 122; the first switching device 112 and the second switching device 122 are typically formed of a thin film transistor TFT. The timing selection of two specific scan signals and common signals will be described below as an example.

Figure 13:
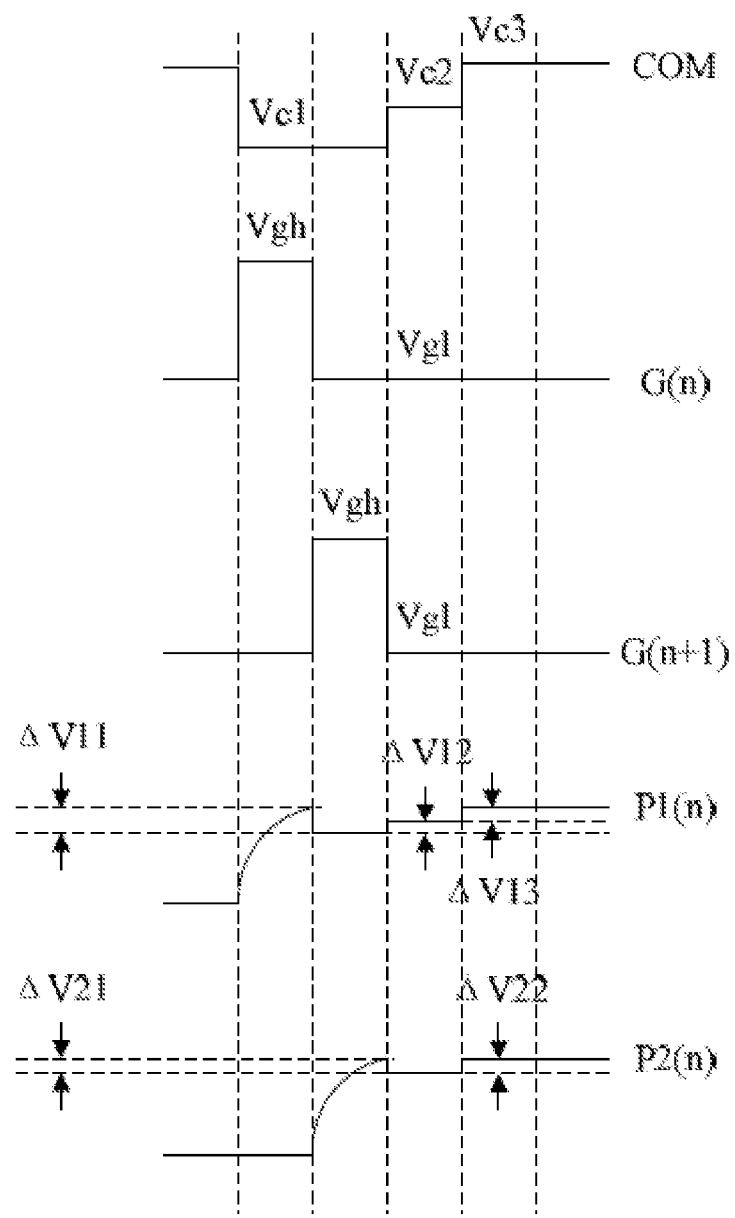
FIG. 13 is a view of the signal timing in a specific example of a display panel of the present application.

In a specific example, as shown in FIGS. 10 and 13, the first continuous duration of the first common level Vc1 is equivalent to twice the opening duration of the scan signal (i.e., the continuous duration corresponding to the high level Vgh of the scan signal), the second continuous duration of the second common level Vc2 is equivalent to the opening duration, and the third continuous duration of the third common level Vc3 is equivalent to the opening duration.

FIG. 13 is a timing view showing signals of the first pixel 110 and the second pixel 120 in the dotted box of FIG. 10, wherein the first pixel 110 corresponds to the scan line of the latter stage, and the second pixel corresponds to the scan line of the current stage. Then, when the scan signal G(n) on the scan line of the current stage is converted from the high level Vgh to the low level Vgl, that is, the scan line of the current stage controls the second pixel 120 to be switched from the on state to the off state, the change in the second pixel level on the second pixel electrode 121 of the second pixel 120 is Δ V11=(Vgh−Vgl)*Cgs2/(Cgs2+Cst2+Clc2). When the common signal COM on the common line is converted from the first common level Vc1 to the second common level Vc2, the change in the second pixel level of the second pixel 120 is Δ V12=(Vc1−Vc2)*Cst2/(Cgs2+Cst2+Clc2). When the common signal on the common line is converted from the second common level Vc2 to the third common level Vc3, the change in the second pixel level of the second pixel 120 is Δ V13=(Vc2−Vc3)*Cst2/(Cgs2+Cst2+Clc2). In order to better alleviate the flickering of the display caused by the kick back, Δ V11, Δ V11, and Δ V13 should satisfy Δ V11+Δ V12+Δ V13=0, that is, the second storage capacitor Cst2 satisfies Cst2=(Vgh−Vgl)*Cgs2/(Vc3−Vc1). Similarly, when the scan signal G(n+1) on the scan line of the latter stage is converted from the high level Vgh to the low level Vgl, and the common signal COM on the common line is converted from the first common level Vc1 to the second common level Vc2, the change Δ V21 in the first pixel level of the first pixel 110 satisfies Δ V21=(Vgh−Vgl)*Cgs1/(Cgs1+Cst1+Clc1)+(Vc1−Vc2)*Cst1/(Cgs1+Cst1+Clc1), wherein the first term corresponds to a kick back of the first pixel level when the scan signal G(n+1) is converted from the high level Vgh to the low level Vgl, and the second term corresponds to a kick back of the first pixel level when the common signal COM on the common line is converted from the first common level Vc1 to the second common level Vc2. When the common signal is converted from the second common level Vc2 to the third common level Vc3, the change in the first pixel level of the first pixel 110 is Δ V22=(Vc2−Vc3)*Cst1/(Cgs1+Cst1+Clc1). In order to minimize the kick back effect, Δ V21 and Δ V22 should satisfy Δ V21+Δ V22=0, that is, the first storage capacitor Cst1=(Vgh−Vgl)*Cgs1/(Vc3−Vc1).

Figure 14:
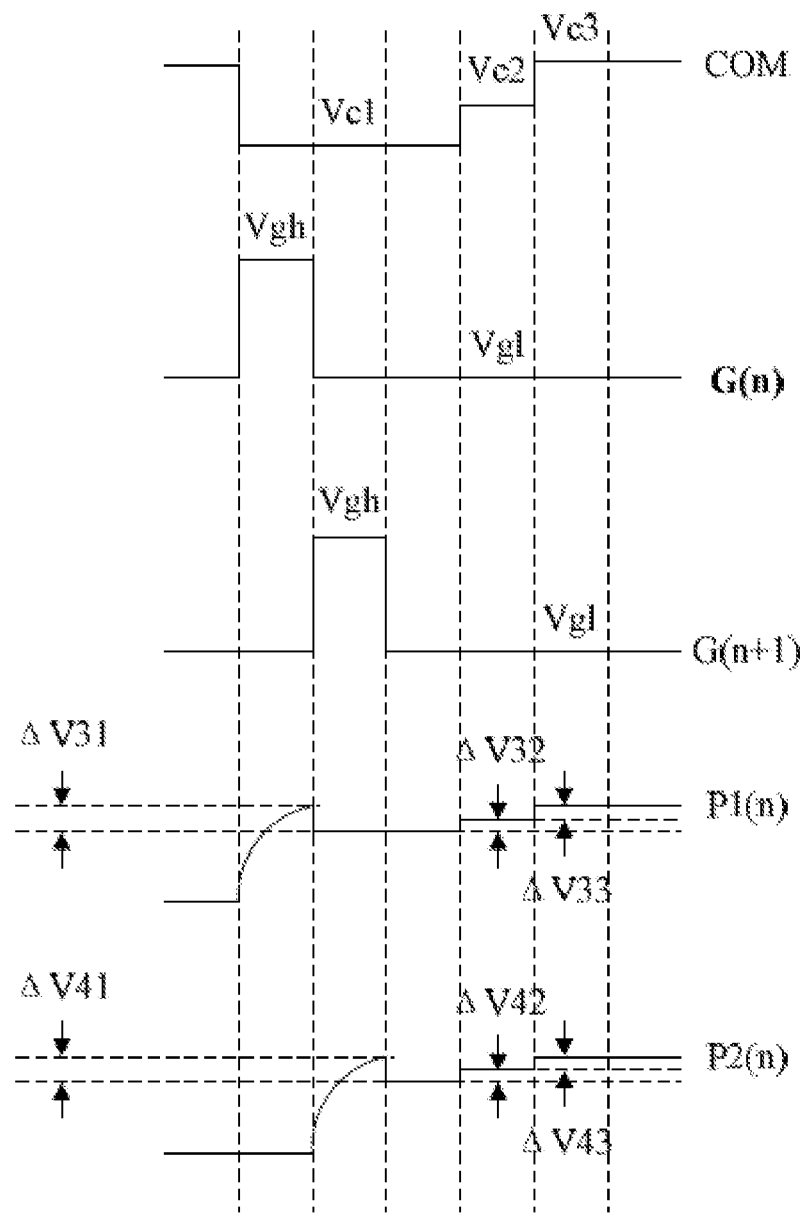
FIG. 14 is a view of the signal timing in another specific example of a display panel of the present application.

In another specific example, as shown in FIGS. 10 and 14, the first continuous duration of the first common level Vc1 is equivalent to three times the opening duration of the scan signal, the second continuous duration of the second common level Vc2 is equivalent to the opening duration of the scan signal, and the third continuous duration of the third common level Vc3 is equivalent to the opening duration of the scan signal. When the scan signal G(n) on the scan line of the current stage is converted from the high level Vgh to the low level Vgl, the change in the second pixel level on the second pixel electrode 121 of the second pixel 120 corresponding to the scan line of the current stage is Δ V31=(Vgh−Vgl)*Cgs2/(Cgs2+Cst2+Clc2). When the common signal on the common line is converted from the first common level Vc1 to the second common level Vc2, the change in the second pixel level of the second pixel 120 is Δ V32=(Vc1−Vc2)*Cst2/(Cgs2+Cst2+Clc2). When the common signal on the common line is converted from the second common level Vc2 to the third common level Vc3, the change in the second pixel level of the second pixel 120 is Δ V33=(Vc2−Vc3)*Cst2/(Cgs2+Cst2+Clc2). In order to alleviate the flickering of the display caused by the kick back as much as possible, Δ V31, Δ V31, and Δ V33 should satisfy Δ V31+ΔV32+ΔV33=0, that is, the second storage capacitor Cst2=(Vgh−Vgl)*Cgs2/(Vc3−Vc1). Similarly, when the scan signal G(n+1) on the scan line of the latter stage is converted from the high level Vgh to the low level Vgl, the change in the first pixel level of the first pixel 110 corresponding to the scan line of the latter stage is Δ V41=(Vgh−Vgl)*Cgs1/(Cgs1+Cst1+Clc1); when the common signal on the common line is converted from the first common level Vc1 to the second common level Vc2, the change in the first pixel level of the first pixel 110 is Δ V42=(Vc1−Vc2)*Cst1/(Cgs1+Cst1+Clc1). When the common signal on the common line is converted from the second common level Vc2 to the third common level Vc3, the change in the first pixel level of the first pixel 110 is Δ V43=(Vc2−Vc3)*Cst1/(Cgs1+Cst1+Clc1). In order to alleviate the flickering of the image, Δ V41, Δ V42, and Δ V43 should satisfy ΔV41+ΔV42+ΔV43=0, that is, the first storage capacitor Cst1=(Vgh−Vgl)*Cgs1/(Vc3−Vc1).

The present application further provides a display device comprising a display panel. The specific structure of the display panel is described in the above embodiments. The display device adopts all the technical solutions of all the above embodiments, and details are not described herein again.

The above mentioned is only the optional embodiment of the present application, which does not limit the patent scope of the present application, and any equivalent structure or process made under the concepts of the present application by using the specification and the drawings of the present application or direct or indirect applications in other related technical fields should be contained in the scope of patent protection in a similar way.

What is claimed is:

1. A display panel, wherein the display panel comprises:
   a plurality of data lines;
   a plurality of scan lines;
   a plurality of common lines, including a main common electrode, a first common electrode, and a second common electrode, wherein the main common electrode, the first common electrode, and the second common electrode of a same common line are electrically connected, the main common electrode and the plurality of scan lines are arranged one after another, the first common electrode is disposed adjacent to the plurality of data lines, and the second common electrode is disposed adjacent to plurality of the data lines;
   a plurality of first pixels including a first pixel, wherein a driving brightness of the first pixel is greater than an original brightness of the first pixel, the first pixel including a first pixel electrode, and the first pixel electrode partially overlaps the first common electrode to form a first storage capacitor; and,
   a plurality of second pixels including a second pixel, wherein a driving brightness of the second pixel is less than an original brightness of the second pixel, the second pixel including a second pixel electrode, and the second pixel electrode partially overlaps the second common electrode to form a second storage capacitor;
   a common signal on the common lines has a first common level Vc1, a second common level Vc2, and a third common level Vc3, the first common level Vc1 being lower than the second common level Vc2 and the second common level Vc2 being lower than the third common level Vc3;
   the second common level Vc2 is located on a rising edge side of the first common level Vc1, and the third common level Vc3 is located on a rising edge side of the second common level Vc2;
   a first continuous duration of the first common level Vc1 is greater than or equal to twice an opening duration of a scan signal on the scan line, a second continuous duration of the second common level Vc2 is greater than or equal to the opening duration, a third continuous duration of the third common level Vc3 is greater than or equal to the opening duration, and the first continuous duration, the second continuous duration, and the third continuous duration are all integer multiples of the opening duration; and
   a falling edge of the first common level Vc1 is synchronized with a rising edge of a scan signal G(n) of a current stage, and a rising edge of a scan signal G(n+1) of a latter stage is synchronized with a falling edge of the scan signal G(n) of the current stage.

2. The display panel according to claim 1, wherein the first pixel electrode partially overlaps the main common electrode and the first common electrode to form the first storage capacitor; and/or,
   the second pixel electrode partially overlaps the main common electrode and the second common electrode to form the second storage capacitor.

3. The display panel according to claim 2, wherein the first pixel electrode partially overlaps with two of first common electrodes, and two of the first common electrodes are disposed on two sides of the first pixel electrode respectively; and/or,
   the second pixel electrode partially overlaps with two of second common electrodes, and two of the second common electrodes are disposed on two sides of the second pixel electrode respectively.

4. The display panel according to claim 2, wherein the first pixel and the second pixel are arranged in a rectangular array, and the first pixel and the second pixel are disposed one after another.

5. The display panel according to claim 4, wherein a mixed gamma response of the first pixel and the second pixel is equivalent to a preset gamma response.

6. The display panel according to claim 4, wherein the first pixel and the second pixel respectively corresponding to two adjacent common lines are electrically connected to a same scan line, the first pixel and the second pixel are disposed adjacent to each other, the scan line is located between the two adjacent common lines, and the first pixel and the second pixel are electrically connected to two of the data lines respectively.

7. The display panel according to claim 1, wherein the first continuous duration is equivalent to twice the opening duration, the second continuous duration is equivalent to the opening duration, and the third continuous duration is equivalent to the opening duration; or,
   the first continuous duration is equivalent to three times the opening duration, the second continuous duration is equivalent to the opening duration, and the third continuous duration is equivalent to the opening duration.

8. The display panel according to claim 1, wherein the first storage capacitor Cst1 of the first pixel satisfies Cst1=(Vgh−Vgl)*Cgs1/(Vc3−Vc1), and the second storage capacitor Cst2 of the second pixel satisfies Cst2=(Vgh−Vgl)*Cgs2/(Vc3−Vc1);
   wherein Vgh is a high level of the scan signal, and Vgl is a low level of the scan signal; the first pixel includes a first switching device, and a first parasitic capacitance Cgs1 is formed between a source and a gate of the first switching device; the second pixel includes a second switching device, and a second parasitic capacitance Cgs2 is formed between a source and a gate of the second switching device.

9. The display panel according to claim 1, wherein the first pixel electrode partially overlaps with two of first common electrodes, and two of the first common electrodes are disposed on two sides of the first pixel electrode respectively; and/or, the second pixel electrode partially overlaps with two of second common electrodes, and two of the second common electrodes are disposed on two sides of the second pixel electrode respectively.

10. The display panel according to claim 1, wherein the first pixel and the second pixel are arranged in a rectangular array, and the first pixel and the second pixel are disposed one after another.

11. The display panel according to claim 10, wherein a mixed gamma response of the first pixel and the second pixel is equivalent to a preset gamma response.

12. The display panel according to claim 10, wherein the first pixels and the second pixel respectively corresponding to two adjacent common lines are electrically connected to a same scan line, the first pixel and the second pixel are disposed adjacent to each other, the scan line is located between the two adjacent common lines, and the first pixel and the second pixel are electrically connected to two of the data lines respectively.

13. The display panel according to claim 12, wherein a common signal on the common lines has a first common level Vc1, a second common level Vc2, and a third common level Vc3, the first common level Vc1 being lower than the second common level Vc2 and the second common level Vc2 being lower than the third common level Vc3;

the second common level Vc2 is located on a rising edge side of the first common level Vc1, and the third common level Vc3 is located on a rising edge side of the second common level Vc2;

a first continuous duration of the first common level Vc1 is greater than or equal to twice an opening duration of a scan signal on the scan line, a second continuous duration of the second common level Vc2 is greater than or equal to the opening duration, a third continuous duration of the third common level Vc3 is greater than or equal to the opening duration, and the first continuous duration, the second continuous duration, and the third continuous duration are all integer multiples of the opening duration;

a falling edge of the first common level Vc1 is synchronized with a rising edge of a scan signal G(n) of the current stage, and a rising edge of a scan signal G(n+1) of a latter stage is synchronized with a falling edge of the scan signal G(n) of the current stage.

14. The display panel according to claim 13, wherein the first continuous duration is equivalent to twice the opening duration, the second continuous duration is equivalent to the opening duration, and the third continuous duration is equivalent to the opening duration; or, the first continuous duration is equivalent to three times the opening duration, the second continuous duration is equivalent to the opening duration, and the third continuous duration is equivalent to the opening duration.

15. The display panel according to claim 13, wherein the first storage capacitor Cst1 of the first pixel satisfies Cst1= (Vgh−Vgl)*Cgs1/(Vc3−Vc1), and the second storage capacitor Cst2 of the second pixel satisfies Cst2=(Vgh−Vgl) *Cgs2/(Vc3−Vc1);

wherein Vgh is a high level of the scan signal, and Vgl is a low level of the scan signal; the first pixel includes a first switching device, and a first parasitic capacitance Cgs1 is formed between a source and a gate of the first switching device; the second pixel includes a second switching device, and a second parasitic capacitance Cgs2 is formed between a source and a gate of the second switching device.

16. A display panel, wherein the display panel comprises:
a plurality of data lines;
a plurality of scan lines;
a plurality of common lines, including a main common electrode, a first common electrode, and a second common electrode, wherein the main common electrode, the first common electrode, and the second common electrode of a same common line are electrically connected, the main common electrode and the plurality of scan lines are arranged one after another, the first common electrode is disposed adjacent to the plurality of data lines, and the second common electrode is disposed adjacent to the plurality of data lines;
a plurality of first pixels including a first pixel, wherein a driving brightness of the first pixel is greater than an original brightness of the first pixel, the first pixel including a first pixel electrode, and the first pixel electrode partially overlaps the first common electrode to form a first storage capacitor; and,
a plurality of second pixels including a second pixel, wherein a driving brightness of the second pixel is less than an original brightness of the second pixel, the second pixel including a second pixel electrode, and the second pixel electrode partially overlaps the second common electrode to form a second storage capacitor;
wherein the first pixel and the second pixel are arranged in a rectangular array, and the first pixel and the second pixel are disposed one after another; a mixed gamma response of the first pixel and the second pixel is equivalent to a preset gamma response;
a common signal on the common lines has a first common level Vc1, a second common level Vc2, and a third common level Vc3, the first common level Vc1 being lower than the second common level Vc2 and the second common level Vc2 being lower than the third common level Vc3;
the second common level Vc2 is located on a rising edge side of the first common level Vc1, and the third common level Vc3 is located on a rising edge side of the second common level Vc2;
a first continuous duration of the first common level Vc1 is greater than or equal to twice an opening duration of a scan signal on the scan line, a second continuous duration of the second common level Vc2 is greater than or equal to the opening duration, a third continuous duration of the third common level Vc3 is greater than or equal to the opening duration, and the first continuous duration, the second continuous duration, and the third continuous duration are all integer multiples of the opening duration; and
a falling edge of the first common level Vc1 is synchronized with a rising edge of a scan signal G(n) of a current stage, and a rising edge of a scan signal G(n+1) of a latter stage is synchronized with a falling edge of the scan signal G(n) of the current stage.

17. A display device, wherein the display device comprises a display panel including:
a plurality of data lines;
a plurality of scan lines;

a plurality of common lines, including a main common electrode, a first common electrode, and a second common electrode, wherein the main common electrode, the first common electrode, and the second common electrode of a same common line are electrically connected, the main common electrode and the plurality of scan lines are arranged one after another, the first common electrode is disposed adjacent to the plurality of data lines, and the second common electrode is disposed adjacent to the plurality of data lines;

a plurality of first including a first pixel, wherein a driving brightness of the first pixel is less than an original brightness of the first pixel, the first pixel including a first pixel electrode, and the first pixel electrode partially overlaps the first common electrode to form a first storage capacitor; and, a plurality of second pixels including a second pixel, wherein a driving brightness of the second pixel is greater than an original brightness of the second pixel, the second pixel including a second pixel electrode, and the second pixel electrode partially overlaps the second common electrode to form a second storage capacitor;

a common signal on the common lines has a first common level Vc1, a second common level Vc2, and a third common level Vc3, the first common level Vc1 being lower than the second common level Vc2 and the second common level Vc2 being lower than the third common level Vc3;

the second common level Vc2 is located on a rising edge side of the first common level Vc1, and the third common level Vc3 is located on a rising edge side of the second common level Vc2;

a first continuous duration of the first common level Vc1 is greater than or equal to twice an opening duration of a scan signal on the scan line, a second continuous duration of the second common level Vc2 is greater than or equal to the opening duration, a third continuous duration of the third common level Vc3 is greater than or equal to the opening duration, and the first continuous duration, the second continuous duration, and the third continuous duration are all integer multiples of the opening duration; and a falling edge of the first common level Vc1 is synchronized with a rising edge of a scan signal G(n) of a current stage, and a rising edge of a scan signal G(n+1) of a latter stage is synchronized with a falling edge of the scan signal G(n) of the current stage.

18. The display device according to claim 17, wherein the first pixel electrode partially overlaps the main common electrode and the first common electrode to form the first storage capacitor; and/or, the second pixel electrode partially overlaps the main common electrode and the second common electrode to form the second storage capacitor.

19. The display device according to claim 17, wherein the first pixel and the second pixel are arranged in a rectangular array, and the first pixel and the second pixel are disposed one after another; a mixed gamma response of the first pixel and the second pixel is equivalent to a preset gamma response.

* * * * *